Figure 1:
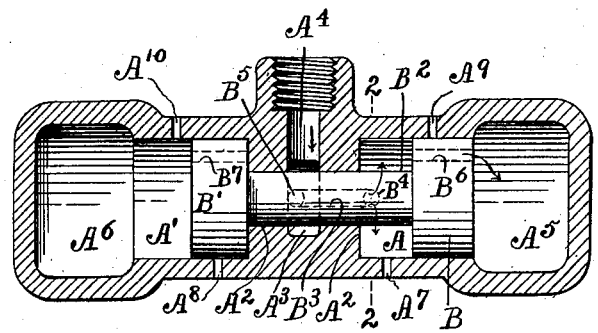

No. 682,599. Patented Sept. 17, 1901.
T. R. BROWNE.
DIFFERENTIAL PISTON VALVE AND PUMP.
(Application filed Feb. 18, 1899. Renewed Feb. 20, 1901.)
(No Model.) 5 Sheets—Sheet 1.

Attest:
L. Lee
Edw. F. Kinsey

Inventor.
Thomas R. Browne, per
Thomas S. Crane, atty.

THE NORRIS PETERS CO., PHOTO-LITHO., WASHINGTON, D. C.

No. 682,599. Patented Sept. 17, 1901.
T. R. BROWNE.
DIFFERENTIAL PISTON VALVE AND PUMP.
(Application filed Feb. 18, 1899. Renewed Feb. 20, 1901.)
(No Model.) 5 Sheets—Sheet 2.
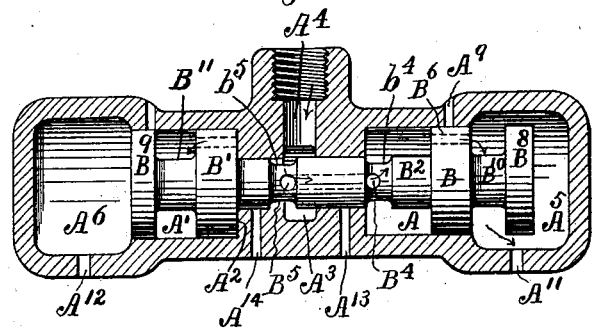
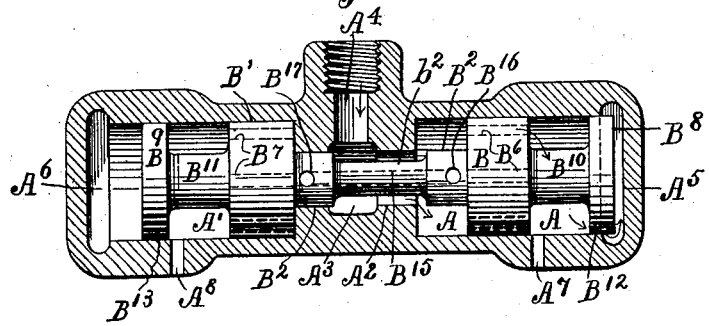
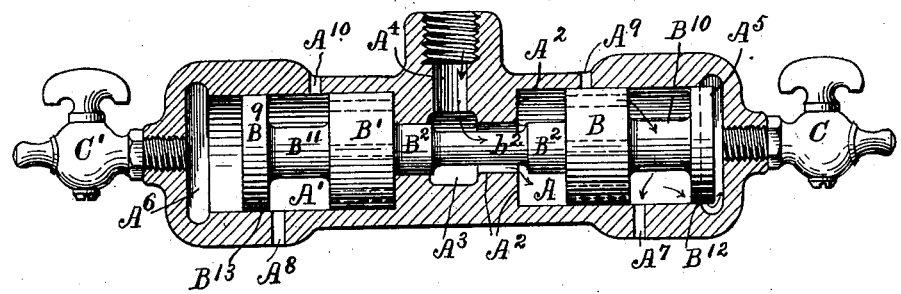
Attest:
L. Lee
Edw. F. Kinsey
Inventor.
Thomas R. Browne, per
Thomas S. Crane, Atty.
THE NORRIS PETERS CO., PHOTO-LITHO., WASHINGTON, D. C.

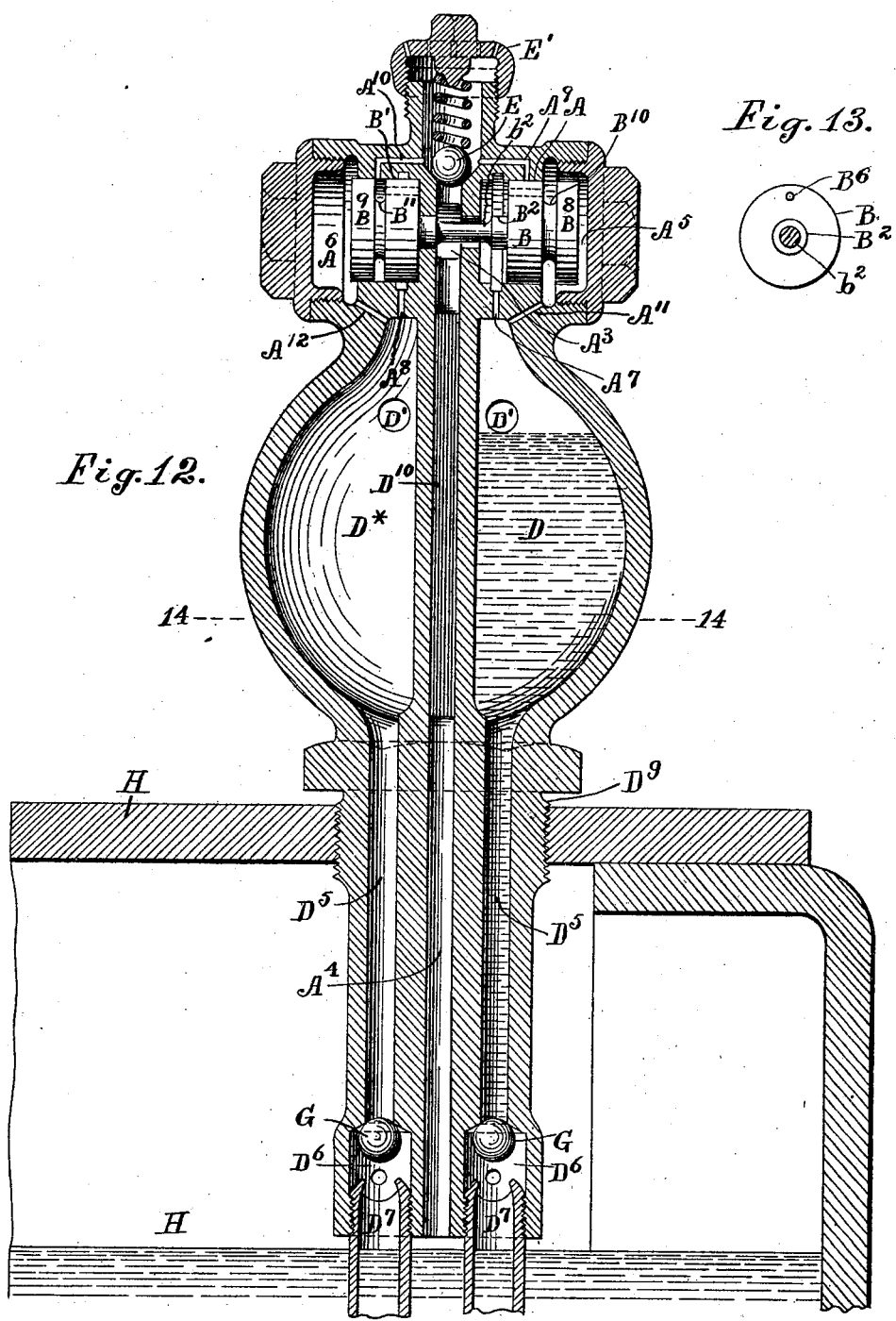

No. 682,599. Patented Sept. 17, 1901.
T. R. BROWNE.
DIFFERENTIAL PISTON VALVE AND PUMP.
(Application filed Feb. 18, 1899. Renewed Feb. 20, 1901.)
(No Model.) 5 Sheets—Sheet 4.

No. 682,599. Patented Sept. 17, 1901.
T. R. BROWNE.
DIFFERENTIAL PISTON VALVE AND PUMP.
(Application filed Feb. 18, 1899. Renewed Feb. 20, 1901.)
(No Model.) 5 Sheets—Sheet 5.

Attest:
L. Lee,
Edw. F. Kinsey.

Inventor.
Thomas R. Browne, per
Thomas S. Crane, Atty.

UNITED STATES PATENT OFFICE.

THOMAS R. BROWNE, OF ALTOONA, PENNSYLVANIA.

DIFFERENTIAL-PISTON VALVE AND PUMP.

SPECIFICATION forming part of Letters Patent No. 682,599, dated September 17, 1901.

Application filed February 18, 1899. Renewed February 20, 1901. Serial No. 48,202. (No model.)

*To all whom it may concern:*

Be it known that I, THOMAS R. BROWNE, a citizen of the United States, residing at Altoona, county of Blair, State of Pennsylvania, have invented certain new and useful Improvements in Differential-Piston Valves and Pumps Actuated Thereby, fully described and represented in the following specification and the accompanying drawings, forming a part of the same.

The object of the present invention is to provide a piston-valve adapted to reciprocate automatically when supplied with steam and to not only distribute the steam to the opposite ends of the valve for reciprocating the same, but also, if desired, to open and close exhaust-passages from the ends of the piston to the air, and, further, to open and close ports for conducting live steam to a working chamber, as the cylinder of a pump, engine, or steam-hammer.

The opposed faces of the piston-valve are formed upon the outer sides of two heads connected by a stem, the inner and outer faces of such heads forming differential pistons, so that when steam of the same pressure operates simultaneously upon the inner and outer sides of such head the motion of the valve is effected by the excess of pressure upon the larger piston. The pistons are fitted to cylindrical portions of the casing, which are in connection at their outer ends with two steam-chambers, termed "operating - chambers" herein to distinguish them, respectively, from the "live-steam" chamber, which supplies steam to the pistons, and the "working" chamber or chambers, (as the interior of a pump or engine-cylinder,) within which an intermittent supply of steam may be required to perform certain work. Each of the operating-chambers is provided with means whereby a gradual fall in the pressure of its contained steam is intermittingly effected when cut off from the steam-supply, and the motion of the valve is effected by the excess of pressure upon one of its said opposed faces over that upon the other. The cylinders and the operating-chambers are conveniently formed in the valve-casing with a live-steam chamber, which supplies the valve with steam and which is located around the stem which connects the pistons between two necks fitted to the stem at the inner end walls of the cylinders. The steam is supplied alternately to the cylinders by a distributing channel or port extending through or along the stem and having openings which are brought alternately, by the movement of the valve, into communication with the two cylinders. A passage of restricted dimensions is provided through each of the pistons to conduct the steam to each operating-chamber when the adjacent cylinder is supplied by the distributing-port. When a sufficient fall of pressure is produced in one of the operating-chambers by condensation or the venting of the steam, the valve is moved toward such chamber by the steam-pressure upon its opposite end, and such movement is reversed and repeated as fast as the pressure in each operating-chamber is reduced to a suitable point.

While my valve may be usefully applied for various purposes, it is chiefly designed for use in a boiler feed-water pump, in which the feed-water chamber is alternately filled with water and emptied into the boiler by directing steam intermittingly into such feed-water chamber by means of the valve. Such pump will maintain a given water-level in the boiler if the steam-pipe for the valve-casing be carried into the boiler to such water-line, the pump-chamber being in all cases arranged above such water-line, so that the water may flow by gravity from the same into the boiler when steam is admitted into such pump-chamber.

The construction will be understood by reference to the annexed drawings, in which—

Figure 2:
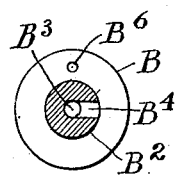
Figure 3:
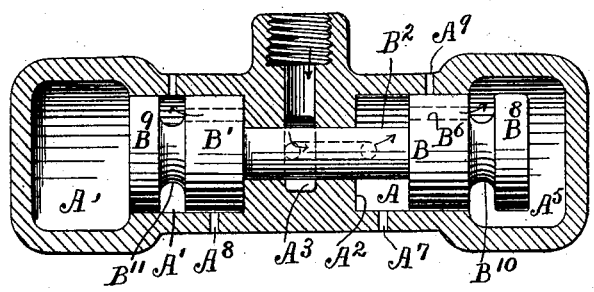
Figure 4:
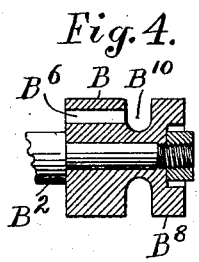
Figure 5:
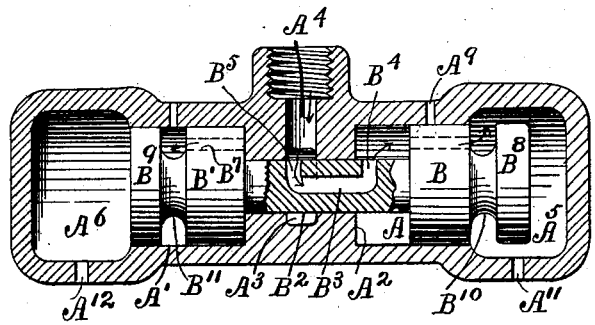
Figure 7:
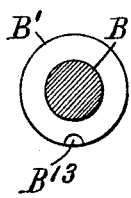
Figure 6:
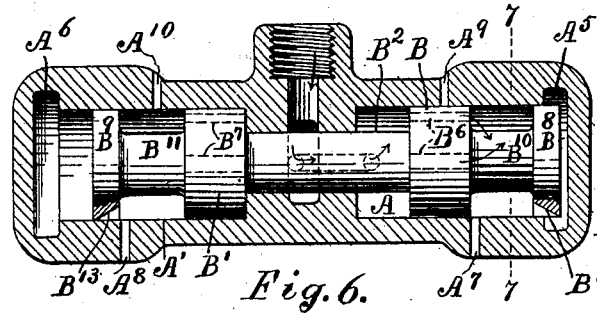
Figure 8:
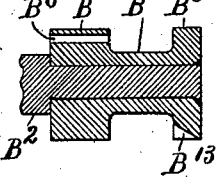
Figure 14:
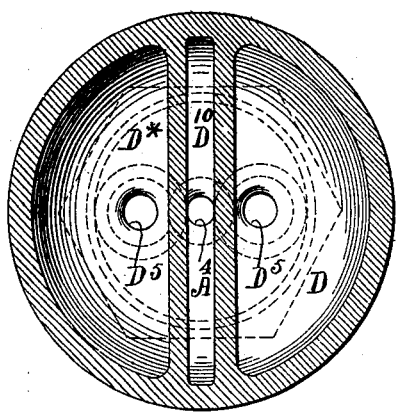
Figure 15:
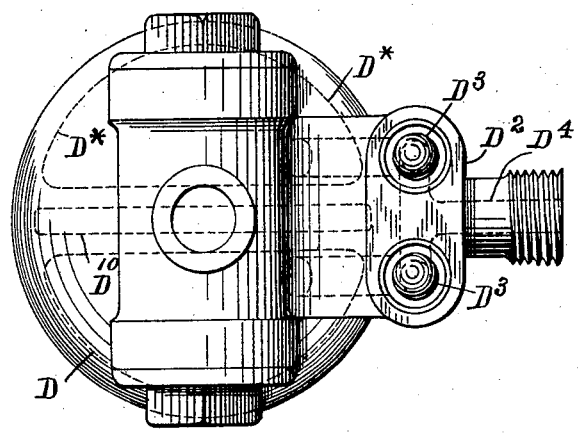
Figure 16:
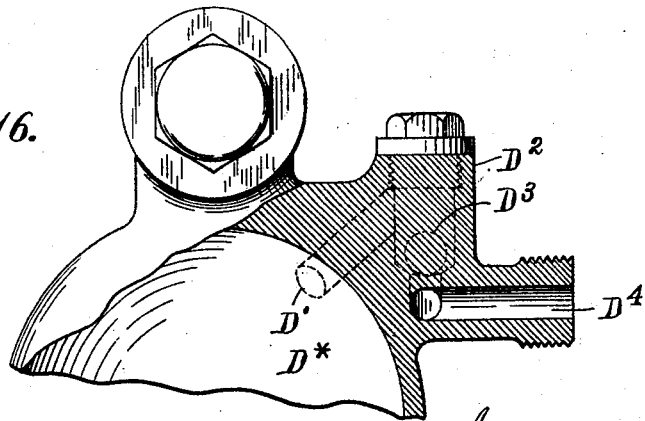
Figure 17:
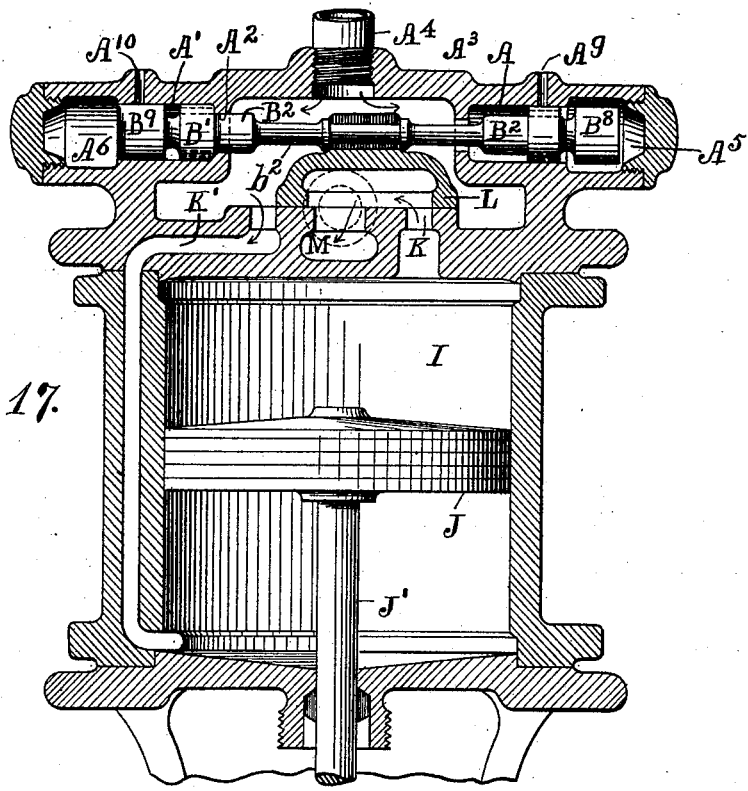
Figure 18:
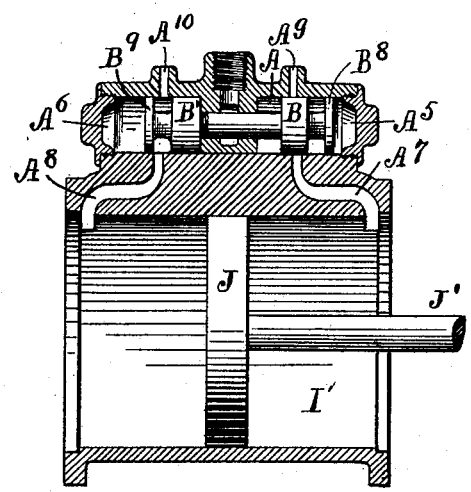

Figure 1 is a longitudinal section of the valve-casing with the valve shown therein at one extreme of its movement. Fig. 2 is an end view of the valve in section on line 2 2 in Fig. 1. Fig. 3 is a view similar to Fig. 1, with the valve having supplemental heads upon the ends. Fig. 4 is a longitudinal section of one end of the valve. Fig. 5 is a view similar to Fig. 3 with the stem of the valve shown in section and ports extended from the operating-chambers. Fig. 6 represents a modification with means for venting the operating-chambers. Fig. 7 is an end view of the valve in section on line 7 7 in Fig. 6. Fig. 8 is a longitudinal section of one end of the valve. Fig. 9 is a view similar to Fig. 5 with modifications of the stem and the exhaust-ports. Fig. 10 is a similar section showing a modification of the operating-chambers and the valve-stem. Fig. 11 shows a modification of the construction shown in Fig. 10 with vent-cocks upon the operating-chambers. Fig. 12 is a sectional elevation showing the valve combined with a feed-water pump having two water-chambers. Fig. 13 is a cross-section of the valve at the middle of its length. Fig. 14 is a cross-section of the pump-chamber on line 14 14 in Fig. 12. Fig. 15 is a plan of the combined pump and valve-chamber, and Fig. 16 is an end view of the valve-chamber with the adjacent parts of the pump-chamber in section at the center line. Figs. 17 and 18 show two applications of the valve to steam-engine cylinders.

The general principles upon which my valve is constructed and operates may be understood from Fig. 1 of the drawings, which shows a valve-casing formed with cylindrical portions A and A', having a live-steam chamber $A^3$ located between their inner ends, which are formed by annular necks $A^2$. The valve has heads B B' at its opposite ends, connected by a stem $B^2$, working through the live-steam chamber $A^3$ and fitted to the necks $A^2$. The heads B and B' fit movably in the cylinders, which receive their steam-supply upon the inner sides of such heads.

$A^5$ and $A^6$ indicate the operating steam-chambers, located in the ends of the casing and opening upon the opposed outer faces of the heads B and B'.

$B^3$ is a steam-distributing channel disposed in the middle of the stem $B^2$, connecting the heads, and provided with lateral openings $B^4$ and $B^5$, arranged to connect the steam-chamber $A^3$ with the cylinder A or A' in accordance with the position of the valve.

$B^6$ and $B^7$ designate holes drilled through the heads B and B', forming passages for steam from the cylinders to the operating-chambers.

$A^7$ and $A^8$ indicate ports leading, respectively, from the cylinders A and A' for connection with working chambers or conduits, (not shown,) but in which it is assumed that an intermittent supply of steam is required. These ports are so located as to be closed when either head is against the adjacent neck and to be opened when the head is in the opposite position.

The valve is shown at the extreme right-hand end of its movement with the port $A^7$ open and the port $A^8$ closed by the head B'. The passage $B^3$ is proportioned to connect the live-steam chamber with the cylinder A or A' when the head is moved almost entirely outward in the said cylinder. In the position shown it is obvious that steam will pass from the chamber $A^3$ through the opening $B^5$ into the distributing-channel $B^3$ and thence through the opening $B^4$ into the cylinder A in the space between the head B and the neck $A^2$ of the cylinder-chamber, whence the steam will pass through the port $A^7$ into any chamber or conduit provided in connection therewith. The accession of steam to the cylinder also supplies the adjacent operating-chamber $A^5$ through the hole or passage $B^6$. The opposite sides of the head B or B' form differential pistons, the area of the outer piston being equal to the end of the head, while the area of the inner piston is diminished by the sectional area of the stem $B^2$. When the steam-pressure is equalized upon opposite sides of the head, the head will necessarily be moved from the operating-chamber by the excess of area upon the outer end of the head. The passage $B^6$ is for most purposes of restricted size, so that the steam will accumulate pressure gradually in the chamber $A^5$ until sufficient pressure is reached to force the valve to the left, (away from the operating-chamber,) which moves the head B into contact with the neck $A^2$. As a result of this movement, the flow of steam through the steam-port $B^3$ from the live-steam chamber $A^3$ to the cylinder A is cut off and also the flow of steam from the cylinder A through the port $A^7$ by the head B, covering said port. When the valve is thus reversed, the head B' bears the same relation to the operating-chamber $A^6$ and the port $A^8$ as already described in connection with the chamber $A^5$ and port $A^7$, because the steam passes from the live-steam chamber $A^3$ into the cylinder A' and thence through the passage $B^7$ into the operating-chamber and also through the port $A^8$ into any working chamber or duct connected therewith. The same operation therefore takes place at the left-hand end of the valve as above described in respect to the right-hand end; but it will be obvious that the piston-valve cannot again shift its position toward the right until the pressure in the operating-chamber $A^5$ has materially fallen, and such a fall of pressure may be provided for in the construction by simply making the operating-chambers $A^5$ and $A^6$ of suitable dimensions and with exposed walls, so that the steam contained in them will gradually lose heat and pressure. It will thus be understood that the motion of the valve in the casing is intermittingly restricted, the rapidity of its action being effected first by the amount of restriction offered to the flow of the steam through the passages $B^6$ and $B^7$, and, second, by the provision made for the fall of pressure in the operating-chambers $A^5$ and $A^6$ when cut off from the live-steam supply.

It will be observed that the entire distribution of the steam from the central chamber $A^3$ to the cylinders A and A' and the operating-chambers located beyond the heads B B' is effected wholly by passages formed through or along the piston-valve and that no ports or passages are required in the casing to connect the central steam-chamber with the operating-chambers. This makes the construction exceedingly cheap and simple, as the casing requires only the boring of the cylindrical cavities to fit it for the application of the piston.

In the casings shown in Figs. 1 to 11, inclusive, no access is represented to the ends of the casing for boring out the cylinders, as those figures are diagrammatical in character; but the construction employed in practice is shown in Fig. 12, which will be described hereinafter.

The piston-valve, having heads at both ends larger than the intermediate stem, could not be inserted in its place within the casing except one of the heads were removable, and a construction for such purpose is shown in Figs. 4 and 8, Fig. 4 showing the one head secured upon the stem by a nut and Fig. 8 showing the end of the stem riveted in the head. The screwed connection permits the removal of the head with great facility to repair or examine the valve.

For some purposes and under some conditions it is advisable in place of depending altogether upon the condensation of steam in the operating-chambers to provide for the escape of steam from those chambers, so as to secure a more rapid movement of the valve—as, for instance, in supplying steam to the piston of a rock-drill. This may be done by providing properly-restricted exhaust-ports, such as is shown at $A^9$ and $A^{10}$ in Fig. 1, said ports being alternately opened after the valve is moved away from each operating-chamber to vent such chamber.

It will be understood that in valves constructed as in Fig. 1 a certain amount of steam is inclosed in the cylinder A or A' after the head B or B' begins its inward motion in said cylinder, and such steam would obviously interfere with the prompt movement of the valve through its full stroke except it were vented in some manner, and such venting is effected through the passage $B^6$ or $B^7$ in cases where the cylinders are provided with exhaust vent-ports $A^9$ $A^{10}$. In other constructions which I contemplate this passage would be cut off, and even with the provision of the passage $B^6$ or $B^7$ the confined steam might prevent a rapid movement of the valve. To provide for the exhaust of the steam caught in the cylinder where no exhaust is required for the operating-chambers, I provide the supplemental heads $B^8$ and $B^9$, attached to the outer sides of the heads B and B', as shown in Fig. 3, and separated therefrom by annular grooves or necks, (designated $B^{10}$ and $B^{11}$.) The cylinders are so proportioned that the supplemental heads move out of the same into the operating-chambers and permit the free flow of steam from the passage $B^6$ and $B^7$ into such chamber; but upon the inward movement of the heads the supplemental head closes the steam-chamber at or shortly before the time when the head B or B' opens the exhaust-port $A^9$ or $A^{10}$. In this way the escape of steam from the operating-chambers is prevented, while at the same time the contents of the cylinders A and A' are permitted to exhaust through the passage $B^6$ and $B^7$ and the corresponding exhaust-port $A^9$ or $A^{10}$.

In place of the ports $A^7$ and $A^8$, leading, as shown in Figs. 1 and 3, from the cylinders A and A' for supplying working chambers with steam, ports $A^{11}$ and $A^{12}$ are shown in Fig. 5 extended directly from the operating-chambers $A^5$ and $A^6$ and may be thus arranged where the working chambers are exhausted by condensation or through the operating-chambers. Another modification in the arrangement of such ports is shown in Fig. 6, where the ports $A^7$ and $A^8$, though leading from the cylinders A and A', are placed beyond the movement of the heads B and B', so as to receive their steam through the operating-chambers. In this modification it will be noticed that the ports $A^7$ and $A^8$, as the case may be, are alternately placed by the grooves $B^{10}$ and $B^{11}$ of the valve in communication with the exhaust-ports $A^9$ and $A^{10}$ to vent the working chambers.

In Fig. 6 I have indicated a number of passages $B^6$ or $B^7$, formed through the heads B and B', but have at the same time provided for a restricted admission of steam into the operating-chambers $A^5$ and $A^6$ by arranging supplemental heads $B^8$ and $B^9$ so that they do not pass entirely out of the cylinders A and A', but supply steam to the operating-chambers when in their outward position through slots $B^{12}$ and $B^{13}$, extended partly through the edges of the supplemental heads. Such slots open a connection for steam between the groove $B^{10}$ or $B^{11}$ into the operating-chambers to supply the latter with steam, but close such connections as soon as the supplemental heads are moved into their respective cylinders.

Fig. 9 shows a modified arrangement for the exhaust-passages $A^9$ and $A^{10}$ and a means for exhausting the cylinders A and A'.

In the modification shown in Fig. 5 it will be noticed in the first place that the width of the grooves $B^{10}$ and $B^{11}$ and the relation of the cylinders A and A' to the exhaust-ports $A^9$ and $A^{10}$ are such as to permit of the exhaust of steam from the operating-chambers during a period ensuing after the heads B and B' have uncovered the exhaust-ports and before the supplemental heads $B^8$ and $B^9$ have entered the ends of the cylinders A and A', after which the exhaust-ports $A^9$ and $A^{10}$ connect only with the inner ends of the cylinders A and A' through the passages $B^6$ and $B^7$, and, as shown, this connection is cut off by the heads $B^8$ and $B^9$ at the ends of their inward strokes. I also show in Fig. 9 a supplemental or alternative provision for exhausting the steam in the inside of the cylinders A and A', consisting of ports $A^{13}$ and $A^{14}$, opening, as shown, through the necks $A^2$, and I form annular grooves, as indicated at $b^4$ and $b^5$, around the ports $B^4$ and $B^5$ of the steam-passage $B^3$ of such width that, for instance, assuming the valve to be moving toward the left in Fig. 9, the groove $b^5$ will have been moved from the steam-chamber $A^3$ and in registry with the exhaust-port $A^{14}$ before the groove $b^4$ has been cut off from connection with the cylinder A.

In the construction shown in Fig. 10 in place of forming in the connecting-stem $B^2$ of the valve the steam-passage $B^3$, as shown in the preceding figures, I recess or contract the central part of the stem, forming a shank $b^2$, adapted in each extreme position of the valve to form a passage for steam from the chamber $A^3$ around the contracted portion of the stem into the cylinders A and A' alternately, this passage being of course cut off on the reverse movement of the valve. I have also indicated in Fig. 10 a passage $B^{15}$, formed through the stem $B^2$ and shank $b^2$ and opening at $B^{16}$ and $B^{17}$ near the junction of the stem with the pistons B and B'. The purpose of this passage is to permit the exhaust of steam from one cylinder into the other. Thus when the valve in Fig. 10 moves to the left it will be obvious that after the full-sized portion $B^2$ of the stem has cut off the connection between the cylinder A and the steam-chamber $A^3$ the steam remaining in the cylinder A will be enabled to pass through the passage $B^{15}$ into the cylinder A'. The passage $B^{15}$ is in no sense essential to the operation of the shank $b^2$, as exhaust-ports $A^9$ and $A^{10}$ may be used with such a neck as in previously-described constructions. Such exhaust-ports are shown in Fig. 11, and the casing is also provided with cocks C C' upon the operating-chambers, by which the fall of pressure in the chambers may be hastened or delayed in any desired degree to regulate the speed of the valve. With the previous constructions the speed of the valve would depend upon the proportions originally given to the parts if operated uniformly with steam of the same pressure, but with such variable outlets from the operating-chambers the speed of the valve may be varied in a very wide range.

The various modifications illustrated in the figures described are by no means exhaustive, but merely indicative of the modifications and changes of construction of which my valve is susceptible without material departure from the principles and leading features of my invention.

In Figs. 12 to 16, inclusive, I have shown an application of the invention to a feed-pump of simple and efficient character, which embodies as a part of its construction my improved valve. By preference I make the pump double-acting and provide that each movement of the valve shall correspond with the forcing of a quantity of water into the boiler. A convenient construction for this purpose is shown in Fig. 12, in which construction I show two pump-chambers D and $D^*$, formed in an integral casting with the valve-casing, the pump-chambers being separated by a steam-chamber $D^{10}$, connecting with the steam-supply pipe $A^4$, which is shown here as reaching to the maximum water-line in the boiler, (indicated at H.) The chamber $D^{10}$ connects at top through a further continuation of the conduit $A^4$ with the steam-chamber $A^3$, and in this construction a safety-valve E is indicated as situated immediately above and operating in connection with the steam-chamber $A^3$. The exhaust-passages $A^9$ and $A^{10}$, leading from the cylinders A and A', are shown extended into the safety-valve chamber above the valve where it is in open communication with the air from the passages shown in the cap E'. Where two pump-chambers are used, as in this construction, the obvious advantage of having a steam-chamber between them will be apparent, as it prevents the water entering one chamber from prematurely condensing the steam entering the other chamber, while at the same time it imparts heat to the water in both chambers. It will be noticed that the pump-chambers D $D^*$ are connected by ports $A^{11}$ and $A^{12}$ with the operating-chambers $A^5$ and $A^6$ of the valve-casing. The pump-chambers are also connected through the ports $A^7$ and $A^8$ with the cylinders A and A' when the valve-heads are in their outer positions in said cylinders; but said ports are entirely cut off by the heads when in their inner position and no exhaust or escape of steam is permitted from either of the steam-chambers or pump-chambers connected therewith, the condensation of the steam being in this construction alone relied upon for the operation of the valve. Into each pump-chamber leads a water-supply passage D', which, as indicated in Figs. 15 and 16, is provided with a ball-valve casing $D^2$ and a non-return ball-valve $D^3$, $D^4$ indicating the continuance of the conduit to a source of water-supply. Such supply may be under pressure or not; but where it is furnished by an aqueduct it is preferable to fill a tank from the aqueduct at a suitable height above the pump-chamber, so as to maintain a nearly uniform pressure in the supply-pipe D', and thus secure a uniform operation of the pump. The same uniformity is secured if we supply the water (by the vacuum in the pump-chamber) from a cistern or bank below the pump. From the bottom of the pump-chamber D leads a water-delivery pipe $D^5$, which is also provided with a ball-valve casing $D^6$, G indicating the ball-valve and $D^7$ a continuation of the delivery-pipe, which should lead to a point in the boiler where the temperature of the water is low. As shown in Fig. 12, the casting is provided with a threaded section $D^9$, adapted to screw into a threaded perforation in the boiler. The pump-chamber from which the water has been discharged and when filled with steam acts as an operating-chamber for the steam-valve and materially effects the period during which the pressure operates upon the valve to hold it at the end of its stroke.

In Fig. 12 the right-hand chamber D is represented with a full supply of water and the steam-valve moved to the position for admitting steam on top of this water, leaving the left-hand chamber D charged with steam and which is in the process of condensing. The pressure of steam upon the top of the water in the right-hand chamber balances the steam-pressure which holds the check-valve G upon its seat and permits the weight of the water due to its height to open the check-valve and flow into the boiler, provided the lower end of the passage $A^4$ is above the water-line. Should it be the case before all of the water in this chamber has been discharged to the boiler that the lower end of the passage $A^4$ becomes submerged, the column of water in such chamber would be held in suspension and its outflow arrested because there would be no supply of steam to take its place within the upper part of the chamber. The movements of the valve thereafter would be more or less irregular, so long as water only could enter the passage $A^4$, as the water has no expansive force or elasticity to operate upon the valve like steam. Such action would continue until the lower end of the passage $A^4$ was exposed by the falling of the water-line, when steam would again find access to the valve, and the water contained in either of the chambers D into which the steam was admitted by the valve would flow freely to the boiler. When the valve is working normally, it will remain in either of its extreme positions until the condensation of steam in one operating-chamber has caused the fall of its pressure and the steam has accumulated in the opposite operating-chamber to a higher pressure, whereupon the valve will be shifted first gradually and after the passage from the steam-chamber $A^3$ into the adjacent cylinder A or A' has been opened rapidly. The steam in the cylinder A is exhausted through the port or ports $B^6$, groove $B^{10}$, and port $A^9$ without venting either the operating-chamber or the pump-chamber, as the operating-chamber is cut off by the supplemental head $B^8$, while the head B closes the port $A^7$ to the pump-chamber.

The above illustration shows the operation of the valve for supplying vacuum-chambers alternately with steam; but it is evident that the valve may be operated in connection with a single pump-chamber D instead of with two by providing only one supply-port $A^7$ or $A^8$ for delivering the live steam. The operation of the valve would also be the same if the outlet of the pump-chamber were connected with the side of the steam-boiler at the water-line instead of the top of the boiler, as shown in Fig. 12. The pump-chamber may consist of a plain vertical pipe of any desired height, with the steam-inlet from the valve properly connected to its upper end. From this description it will be seen that the operation of the pump is independent of its particular construction, although I have claimed such construction herein on account of the great advantages secured by its simplicity of form.

As I have stated in the earlier part of the specification, while my valve is especially adapted and intended for use in connection with feed-pumps it is capable for use in many other devices, and in Fig. 17 I have illustrated its application to the slide-valve L of a steam-pump or engine-cylinder, (indicated at I,) the said valve being connected with the stem of my peculiar valve in the steam-chamber $A^3$ and working over ports K and K', leading, respectively, to the top and bottom of the steam-cylinder and over an exhaust-port M, which is thus connected alternately with the ports of the cylinder.

J indicates the piston and J' the piston-rod of the steam-cylinder. It will be obvious that as my automatic valve moves backward and forward it will work the slide-valve L and govern the admission and exhaust of steam from the two ends of the cylinder I.

In Fig. 18 I have shown an application of the automatic valve to the alternate opening and closing of ports leading into the opposite ends of a cylinder I' without the intervention of a slide-valve. The valve is represented the same as that shown in Fig. 11 and operates to supply and exhaust the steam to and from the opposite ends of the cylinder I'.

My valve is not subject to derangement, as it constitutes when in operation but a single movable piece, which performs the various functions and distributes the steam alternately into the valve-chambers A A', into the operating-chambers connected with the outer ends of the valve, and into any working chambers that may be connected with the valve-cylinders or operating-chambers, while it serves also to vent the valve-cylinders (when desired) to produce a quicker motion of the valve and to also exhaust the steam from the operating or working chambers when necessary. These results are effected by extending the valve-stem through a live-steam chamber and forming the distributing-passage through or along such stem (as through the port $B^3$, Fig. 1, or along the reduced shank $b^2$, Fig. 10) to distribute the steam into the valve-cylinders and their connected chambers. The simplicity of this construction affords the greatest economy in its manufacture and secures the greatest durability and least liability to derangement in operation, while the capacity of the valve to operate with ports variously arranged adapts it for use in a great variety of combinations. When combined with the pump-chamber in a single casting, as shown in the drawings, the utmost simplicity of construction is secured, while the automatic regulation of the water-line in a steam-boiler is secured by taking the steam-supply for my valve from the steam-space of the boiler at such water-line.

With the pump construction shown in the drawings it is obvious that the pump-chamber whose outlet connects with the boiler by check-valve G is exposed to the same pressure at its upper and lower ends when the steam from the boiler is introduced above the water to discharge it from the chamber, and the pressure above the water can therefore exert no power to move it; but the pump-chamber must be set above the water-line and the water moved by its gravity.

The principle of the connection of this valve with a pump is merely its connection to a chamber into which in the absence of steam-pressure water can flow from any convenient source of supply, the valve then supplying a steam-pressure on top of the water which is equivalent to that contained in the boiler. Such regulation is also secured by locating the pump on the side of the boiler, with the top of the water-chamber at about the highest water-level allowable. It will of course be obvious that when the water-line in the boiler coincides with the top of the chamber or even before it reaches this point there will not be a sufficient difference of level to cause the water to flow into the boiler, and the pump will therefore not discharge water to the boiler until a sufficient difference is attained to give it that opportunity. By constructing the pump, as shown in Fig. 16, with two water-chambers each stroke of the valve (or movement in either direction) serves to discharge one chamber to the boiler, and the separation of the chambers by the central steam-partition $D^{10}$ secures the transmission of the steam from the boiler to the piston-valve with the least loss of pressure and prevents such rapid condensation in each chamber (when filled with steam) that it would reverse the valve before the necessary amount of steam had been supplied upon the top of the water in the opposite chamber. The valve may by the action of connected operating-chambers have a movement entirely independent of the water movements in the pump-chambers, and the proportions of the valve as regards length and the diameter of the stem and heads are therefore intended to be such that the valve will stand at either end of its stroke a sufficient length of time to fully discharge one pump-chamber and to fill the adjacent chamber in the case of a double-chambered pump. As the conditions of such boiler feed-pump are liable to vary with different boilers operated under various pressures and with the pressure under which the water is supplied to the pump-chamber, it is obvious that the vent-cocks C and C', placed upon the operating-chambers in Fig. 12, form a very useful adjunct for such a feed-pump when intended for general use, as the speed of the piston-valve may be varied in any degree by varying the opening of such cocks which affect the rate at which the pressure is gradually reduced in such chamber.

It will be understood that the capacity or dimensions of the operating-chambers $A^5$ and $A^6$ would in each case be varied or proportioned to suit the conditions under which the valve was intended to operate with any particular construction.

Having thus set forth the nature of the invention, what is claimed herein is—

1. A valve-casing having operating steam-chambers arranged to open upon opposite faces of a piston-valve and constructed, as specified, so as to effect a gradual fall in the pressure of steam confined therein, in combination with a piston-valve working in said casing and ports controlled by such valve as described, to connect a source of steam-supply alternately with said steam-chambers, substantially as specified, and so as to alternately charge said chambers with steam and permit a gradual fall of pressure therein after the valve has moved from its charging position.

2. An automatic steam-valve having heads B, B', forming two differential pistons and connected by a stem, and combined with a valve-casing having cylinders for the pistons, necks, as $a^2$, fitted to the stem with an intermediate live-steam chamber, operating-chambers in connection with the outer sides of said heads, and a passage adapted by one movement of the valve to supply steam to the differential pistons upon one of the heads, and adapted by the reverse movement of the valve to supply steam to the differential pistons upon the other head.

3. In an automatic steam-valve, a valve-casing having operating-chambers, as $A^5$, $A^6$, at opposite ends, a steam-chamber as $A^3$ arranged intermediate to the same, and suitable cylinders formed between the steam-chamber and each of the operating-chambers, in combination with two differential pistons fitted to such cylinders and connected by a stem, with passages opened by the movement of the valve for supplying steam alternately to the smaller areas, and a passage through each of such pistons into the adjacent operating-chamber for alternately transmitting the steam to the outer side of each piston and thereby reversing the valve by the pressure accumulated in the adjacent operating-chamber, substantially as herein set forth.

4. In an automatic steam-valve, a valve-casing having operating-chambers at opposite ends, a live-steam chamber arranged intermediate to the same, and suitable cylinders formed between the steam-chamber and each of the operating-chambers, in combination with two heads B, B', forming differential pistons fitted to such cylinders and connected by a stem, with passages opened by the movement of the valve to supply steam alternately to the smaller pistons, a port opened when the valve is moved by pressure upon either of the smaller pistons to admit steam to the adjacent operating-chamber for reversing the valve, and exhaust-ports, as $A^9$, $A^{10}$, situated in the cylinders A, A', as described, so as to be closed by the heads B, B', when in their outer positions, and opened while such heads are moving inward and before they reach the end of such inward movement.

5. A valve-casing having operating steam-chambers, as $A^5$, $A^6$, at its opposite ends and adjacent cylindrical portions, as A, A', with contracted necks $A^2$, $A^2$, said operating-chambers being constructed as specified to permit a gradual fall in the pressure of steam confined therein, in combination with a piston-valve having heads, as B, B', working in the cylinders and exposed to the chambers $A^5$, $A^6$, a stem-section $B^2$ fitting and working in the necks $A^2$ said stem-section being formed as described to alternately open and close a connection between a source of steam-supply situated between the necks $A^2$, $A^2$, and the cylinders A and A', and steam-passages $B^6$ and $B^7$ formed in the heads B, B', whereby steam in the cylinder in which such head works is permitted to enter the adjacent operating-chamber, exhaust-ports, as $A^9$, $A^{10}$, situated in the cylindrical sections A, A' as described so as to be closed by the heads B, B', when in their outer positions but opened while said pistons are moving inward and before they reach the end of such inward strokes, and supplemental heads, as $B^8$, $B^9$, secured to the outer faces of the heads B, B', by narrowed necks as $B^{10}$, $B^{11}$, and arranged to restrict the connection between the cylindrical sections and the steam-chambers as the heads move inward and before they open the exhaust-ports $A^9$, $A^{10}$.

6. The combination, with two working chambers, as D, D*, of a valve-casing having operating steam-chambers arranged to open upon opposite faces of a piston-valve and constructed as specified so as to effect a gradual fall in the pressure of steam confined therein, and having two piston-cylinders with an intermediate live-steam chamber, in combination with a piston-valve having heads, as B, B', working in the said cylinders, and steam-passages adapted as described to connect the source of steam-supply alternately with said operating-chambers, substantially as specified, and ports connecting each of the cylinders to one of the working chambers and supplied by the movements of the heads alternately with steam, so as to alternately fill the working chambers, as and for the purpose set forth.

7. The combination, with a pump-chamber, as D, having admission and delivery ports, as D', $D^5$, and non-return valves controlling the passage of fluid therethrough, of a piston-valve casing having a piston-valve working automatically therein and having two operating-chambers opening upon opposite faces of the valve, ports in said valve arranged to connect the said operating-chambers alternately with a source of live-steam supply in accordance with the position of the valve, and means for effecting a gradual fall of the steam-pressure in the operating-chambers when cut off from the steam-supply, substantially as and for the purpose set forth.

8. The combination with two pump-chambers, as D, D*, each having admission and discharge ports, as D', $D^5$, and non-return valves controlling the passage of fluid therethrough, of a live-steam chamber, as $D^{10}$, separating said chambers, a piston-valve having an intermittent automatic reciprocation, and steam-passages controlled by said valve as described and whereby a supply of live steam is alternately admitted to and cut off from the pump-chambers.

9. In combination with two pump-chambers, as D, D*, each having admission and discharge ports, as D', $D^5$, and non-return valves controlling the passage of fluid therethrough, a piston-valve casing having two operating steam-chambers arranged to open upon opposite faces of the valve working therein, ports arranged to connect the operating-chambers alternately with a source of live-steam supply in accordance with the position of the valve, means for effecting a gradual fall of steam-pressure in the operating-chambers when cut off from the steam-supply, live-steam ports leading to each pump-chamber, and a piston-valve automatically working in the valve-chamber aforesaid and arranged as specified to control the ports leading to the steam and pump chambers.

10. In combination with a boiler, a pump-chamber, as D, having an admission-port D', a delivery-port $D^5$, and non-return valves controlling the passage of fluid through ports D' and $D^5$, a piston-valve having an intermittent automatic reciprocation, and a steam-passage from the boiler, as $A^4$, opening at the water-line of the boiler, and controlled by said valve as specified and so that steam is admitted to the pump-chamber in one position of the valve and cut off therefrom in its alternative position.

11. In combination with a boiler, a pump-chamber, as D, having an admission-port D', a delivery-port $D^5$ opening at the water-line of the boiler, and non-return valves controlling the passage of fluid through ports D' and $D^5$, a casing having cylinders with operating steam-chambers arranged to open upon opposite faces of the valve working therein, ports arranged to connect said operating-chambers alternately with the steam-space of the boiler in accordance with the position of the valve, means for effecting a gradual fall in steam-pressure in the operating-chambers when cut off from the source of supply, and the piston-valve working automatically in the valve-cylinders and governing the admission of steam to the operating-chambers aforesaid and to the pump-chamber as described.

12. The combination, with a boiler, of a pump-chamber, as D, having a water-admission port D' and discharge-port $D^5$ and non-return valves controlling the passage of fluid through said ports, a piston-valve having an intermittent automatic reciprocation, and a steam-passage leading from the water-line of the boiler and controlled by said valve as described, and whereby a supply of live steam is alternately admitted to and cut off from the pump-chamber.

13. An automatic boiler feed-pump, comprising a valve having heads B, B' forming two differential pistons connected by a stem, a valve-casing having cylinders for the pistons, necks fitted to the stem with an intermediate live-steam chamber, and operating-chambers in connection with the outer sides of said heads, a pump-chamber having admission and discharge ports, as D', D⁵, and non-return valves controlling the passage of fluid therethrough with a supply of water to the admission-port, and a port opened and closed by one of said heads and connected with such pump-chamber, whereby a gradual fall of steam-pressure induced alternately in the operating-chambers serves to reciprocate the valve and produce the alternate flow of the water into and out of the said water-chamber.

In testimony whereof I have hereunto set my hand in the presence of two subscribing witnesses.

THOMAS R. BROWNE.

Witnesses:
H. A. ANDERSON,
C. W. ALLEMAN.